May 12, 1964   A. G. SHEPHERD   3,132,569
LIGHTWEIGHT MOTOR MEANS
Filed Nov. 13, 1961

INVENTOR.
ALLAN G. SHEPHERD
BY
ATTORNEY 3,132,569
LIGHTWEIGHT MOTOR MEANS
Allan G. Shepherd, Inglewood, Calif., assignor to North American Aviation, Inc.
Filed Nov. 13, 1961, Ser. No. 151,762
5 Claims. (Cl. 92—169)

This invention pertains to lightweight fluid motors of the piston and cylinder type such as used for conversion of fluid pressure to mechanical movement and vice versa.

Motors of the foregoing general type have many common applications, both for initiating movement in response to pressure as in the case of hydraulic motors and servomechanisms and for creating pressure in response to movement as in fluid pumps. In each combination of piston and cylinder regardless of its purpose, the work produced or transmitted depends upon the amount of working pressure and the size of working surface acted upon by the pressure. It is often important that the relative movement of working parts bear a precise predetermined relationship to the amount of pressure applied to the surfaces thereof, and it is therefore commensurately important that leakage of the working fluid not occur between the cylinder walls and piston surfaces in contact therewith.

Leakage of working fluid around cylinders in fluid motors is usually avoided by provision of materials in the piston and cylinder having sufficient strength to resist deformation at the maximum working pressure to which the stated parts will be subjected during their actual use. This results in parts of substantially greater mass and weight than those which would serve if deflection of the cylinder walls could be tolerated without causing leakage. In many applications where component weight is critically important, such as in the case of modern high speed aerial and space vehicles, elimination of all possible mass and weight is obviously desirable.

Accordingly, it is a principal object of this invention to provide fluid motor means having greater strength per unit weight than similar devices heretofore known using identical materials of construction.

It is another object of this invention to provide a cylinder and piston arrangement wherein sealing is maintained between the contacting surfaces of the piston and cylinder during deflection of the cylinder walls.

It is a further object in this case to provide a fluid piston and cylinder combination characterized by improved operating characteristics and economy of weight.

Other important objects and advantages of the instant invention will become apparent upon a close reading of the following detailed explanation of the invention, reference being had to the accompanying drawings, wherein.

Figure 1:
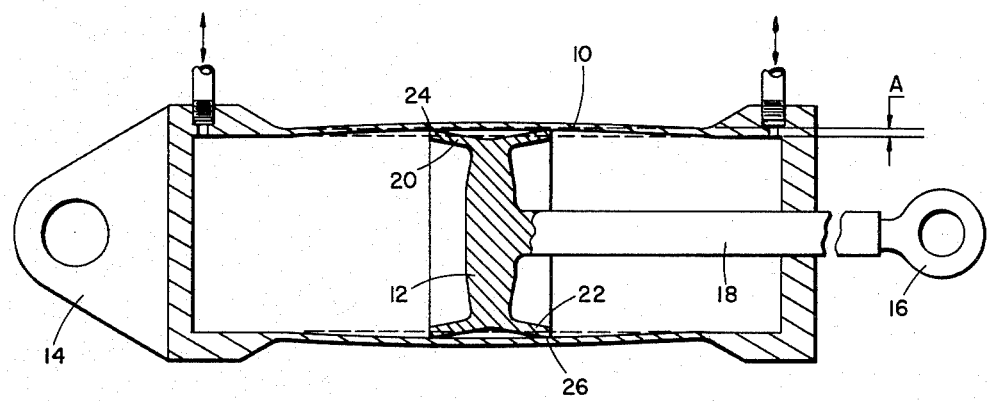
FIGURE 1 shows a view partly in cross-section taken through a cylinder and piston embodying the inventive principles disclosed herein.

Referring to FIGURE 1, it may be seen that the inventive concept in this case includes a fluid cylinder 10 in respect to which a piston 12 within the cylinder is relatively movable. Suitable lugs or pivot connections are provided at 14 and 16 whereby relative movement between cylinder 10 and piston 12, respectively, may be either sensed or caused by operatively related structure connected at 14 and 16, depending upon the purpose and function of the cylinder-piston combination. Thus, for example, if cylinder 10 is used as a hydraulic actuator for moving a control surface in an aerial vehicle in response to a variation of applied fluid pressure, cylinder 10 may be secured to relatively immovable structure by means of pivot connection 14 while a connecting rod 18 affixed to piston 12 may be secured to control surface actuating linkage (not shown) by means of pivot connection 16.

When used as actuating mechanism in accordance with the illustrative example set forth above, it may be seen that the introduction of fluid pressure within cylinder 10 may cause movement of piston 12 in an axial direction toward the left or right as viewed in FIGURE 1, depending upon the side of piston 12 against which the increased pressure acts. During the application of such pressure within cylinder 10, deflection of the cylinder walls outwardly will occur in the absence of restraining force applied to the stated walls to counteract the force of fluid pressure from within. The amount of the stated cylinder wall deflection will depend upon several factors including the selection of materials from which cylinder 10 is fabricated, the thickness of material in the cylinder walls, the temperature of such walls, and the amount of fluid pressure applied from within the cylinder. Thus, the distance indicated at A in FIGURE 1 indicates the type of wall deflection which may occur in the illustrated case and refers to the outward displacement of the cylinder wall at its mid-section due to fluid pressure within cylinder 10 compared with the undisturbed condition wherein equal pressures exist both within the cylinder and externally thereof.

In the event that piston 12 were of conventional type having a constant diameter due to inherent rigidity of the material therein, it will be understood that outward deflection of cylinder walls as indicated by distance A in FIGURE 1 would result in the occurrence of severe leakage of working fluid past the piston periphery, the effect of which would be extremely damaging on the operating characteristics of the piston and cylinder combination, especially where a precise predetermined relationship between working fluid pressure and piston movement is required to be constantly maintained.

In such cases, the conventional approach in designing pistons and cylinders for use in the illustrative example set forth above is to provide the walls of cylinder 10 with sufficient thickness whereby substantially all deflection of the walls would be avoided even during the application of maximum operating pressure. One obvious consequence of the conventional approach is that the weight of the cylinder is increased considerably beyond that which would be required in cylinder walls capable of resisting deflection at operating pressures considerably less than the anticipated maximum. Accordingly, it is an important feature of the invention disclosed herein that cylinder 10 is provided with sufficient wall thickness to avoid rupture of the cylinder walls at the maximum contemplated operating pressure rather than sufficiently thick to avoid substantially all deflection thereof, and that piston 12 is constructed and arranged to maintain sealing contact with the inner surface of the cylinder walls during their deflected condition. Thus, the weight-saving advantage of the invention disclosed herein is due primarily to the operating characteristics of cylinder 10 and piston 12.

The stated operating characteristics, being functional in nature, may be achieved by a wide range of structural configurations which may differ considerably from each other in details of construction but will nevertheless embody the basic principle of this invention. In the illustrative embodiment of FIGURE 1, piston 12 is provided with oppositely facing annular flanges or skirts 20 and 22, each of which is sufficiently resilient to enable the distal edges 24 and 26, respectively, of each skirt to move radially outwardly against the surrounding wall of cylinder 10 and to maintain contact therewith at all times regardless of the amount of outward deflection occurring in such wall during the application of fluid pressure from within. It will be understood that increase of pressure on one side of piston 12 to move the piston will apply outward force to the piston skirts 20 or 22 as the case may be, aiding in deflection of the skirt outwardly to maintain its contact with the wall of cylinder 10.

Figure 2:
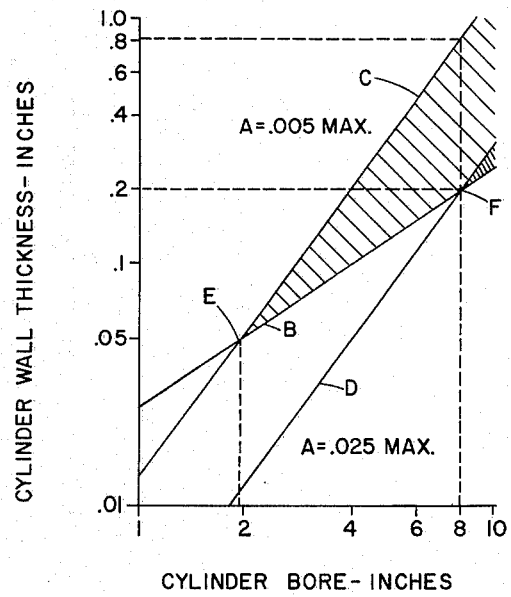
FIGURE 2 is a graphical illustration of the relationship between cylinder size and mass in a given case.
Figure 3:
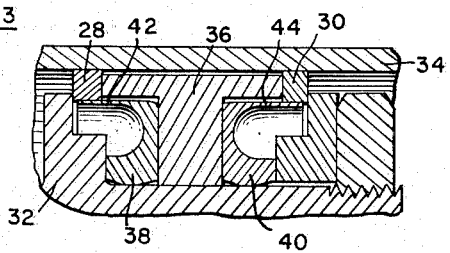
FIGURE 3 shows sealing means suitable for use with the piston.

Many other structural expedients may be adapted to perform the resilient sealing function of skirts 20 and 22 on piston 12. Thus, for example, the construction of piston 12 may take the general form shown in U.S. Patent No. 2,992,052 issued July 11, 1961, but obviously is not limited to such form. Also, many types of commercially available resilient ring seals capable of expanding circumferentially to maintain sealing contact between a piston and cylinder wall may be adapted to perform the sealing function between cylinder 10 and piston 12 instead of skirts 20 and 22. For example, one such type comprising an expandable ring seal is shown in FIGURE 2 of U.S. Patent No. 2,976,066 issued March 21, 1961. As seen from FIGURE 3 in the accompanying drawing, the stated seal from Patent 2,976,066 includes annular sealing rings 28 and 30 which are mounted between a movable piston 32 and a stationary cylinder 34. Spacer member 36 separates rings 28 and 30 axially, while ferrules 38 and 40 each have outwardly resilient lips 42 and 44 which respectively bias rings 28 and 30 radially outwardly in continuous, uniform and intimate sealing contact against the inner wall surface of cylinder 34.

The advantages resulting from application of the inventive principles discussed above are graphically illustrated in FIGURE 2, from which it may be seen that the principles are of increasing significance as the piston and cylinder size is increased. FIGURE 2 shows the logarithmic relationship between cylinder bore and cylinder wall thickness as applied to a particular material of cylinder construction at an assumed temperature of 400° F. In the assumed case, the material is an advanced steel alloy commercially known by the designation AM350, and is composed generally as follows:

| | Percent approx. |
| --- | --- |
| Carbon | 0.10 |
| Nickel | 4.2 |
| Chromium | 17.0 |
| Molybdenum | 2.8 |
| Iron | Balance |

Referring to FIGURE 2, it may be seen that curves B and C represent a comparison of the cylinder wall thickness required to prevent rupture of the material compared with the thickness required to prevent deflection of the cylinder wall diameter beyond a maximum of .005 inches at a given maximum value of operating pressure. Thus, for example, if cylinder 10 of FIGURE 1 is made from AM350 material, if its operating temperature is 400° F., and if its diameter across the inner wall surfaces is 8 inches when the cylinder is in the unpressurized condition, then curves C and B respectively show that a wall thickness of approximately one inch is required to avoid deflection of the wall beyond a diametral increase of .005 inch at the maximum value of operating pressure, whereas the wall thickness sufficient to avoid rupture of the material at the same value of pressure is approximately .2 inch. From this example it may be seen that the curve characteristics in FIGURE 2 depend largely upon the properties of the material from which the cylinder is constructed, particularly with respect to its modulus of elasticity, and that a saving of weight may be achieved by having thinner cylinder walls where the bore size is larger than approximately 1.8 inches, representing a crossover point between curves B and C. Thus, a cylinder constructed from AM350 alloy and operated at 400° F., if it has a bore of one inch diameter would reach the maximum limit of wall deflection of .005 inch before the applied force due to working pressure would cause bursting. As a result, minimum wall thickness of the stated cylinder having one inch bore depends upon the burst characteristics of the material rather than its deflection characteristics, even when resilient sealing means are employed for the piston therein according to the inventive principles discussed above. However, as the cylinder diameter increases, the crossover point designated E in FIGURE 2 occurs between curves B and C, in consequence of which minimum safe cylinder wall thickness may be determined by the amount of maximum permissible deflection thereof rather than upon bursting limits of the material therein.

From the discussion set forth above it may be seen that, when sealing means are provided on piston 12 which can maintain sealing contact between cylinder 10 and piston 12 during deflection of the cylinder wall in an amount larger than .005 inch, the weight of the cylinder may be reduced by lessening the wall thickness to that value which will suffice only to prevent bursting of the cylinder at the maximum anticipated working pressure. Thus, wall thickness in cylinder 10 using the stated material and operating temperature will be sufficiently thick in the case of cylinder bore sizes between approximately 2 and 8 inches diameter as shown in FIGURE 2 if the thickness value in inches at any given bore size within the stated range falls within the shaded area between curves B and C.

Referring to curve D in FIGURE 2, the relationship between cylinder wall thickness and bore size when the maximum permissible deflection of the wall is .025 inch may be seen. A second cross-over point F occurring at the intersection of curves B and D may be seen to correspond generally to cross-over point E between curves C and B. Thus, the same principle by means of which a reduction in wall thickness may be effected for cylinder bore sizes within the general range from 2 to 8 inches as described above in connection with curves C and B is similarly applicable in regard to curves B and D in the case of bore sizes larger than 8 inches and diametral deflections greater than .025 inch.

From the description of structure together with its function as set forth above and illustrated in the drawings, it may be seen that the invention disclosed herein provides a novel piston and cylinder arrangement by means of which a substantial reduction in weight may be effected in comparison with conventional fluid motor or actuator construction, at no loss in the load capacity of the piston and cylinder combination. Application of the principle thus taught has been found to achieve a weight saving of approximately 30 percent in the larger sizes of piston type actuators used in control systems for high speed aerial vehicles wherein weight considerations are of overriding importance.

While the particular structural details suggested above and in the drawings are fully capable of attaining the objects and providing the advantages herein stated, the structure thus disclosed is merely illustrative and could be varied or modified to produce equivalent results without departing from the scope of the inventive concept as defined in the appended claims.

I claim:

1. In a fluid motor comprising a generally elongate hollow cylinder and a relatively movable piston situated therein; an annular wall portion intermediate the ends of said cylinder, said wall portion having a thickness within the range of values limited at one extreme by the minimum thickness required to avoid rupture of said wall portion at the maximum anticipated operating pressure within said cylinder, and at the other extreme by the minimum thickness sufficient to prevent substantially all deflection of said wall portion outwardly under the influence of said maximum anticipated operating pressure.

2. The structure set forth in claim 1 above wherein said piston is provided with sealing means adapted to maintain substantially uniform sealing contact between the relatively movable surfaces of said piston and said wall portion during application of said maximum anticipated operating pressure.

3. The structure set forth in claim 2 above, in which said sealing means comprises an annular flange formed on said piston, the distal edge of said flange being relatively resilient whereby contact between said edge and said wall portion is maintained during deflection of said wall portion.

4. The structure set forth in claim 2 above, wherein said sealing means comprises an expandable ring seal mounted on said piston and movable therewith.

5. In a lightweight cylinder and piston combination, said piston being axially movable within said cylinder and in respect thereto in response to fluid pressure within said cylinder; a resilient annular wall portion in said cylinder having contact with said piston during said movement, said wall portion having a minimum thickness sufficient to avoid bursting at the maximum operating value of said fluid pressure, and said piston having resilient sealing means adapted to maintain substantial sealing contact with said wall portion during deflections thereof caused by said fluid pressure throughout said movement.

References Cited in the file of this patent

UNITED STATES PATENTS

| | | |
|---|---|---|
| 3,053,195 | Williamson | Sept. 11, 1962 |
| 3,053,594 | Williamson | Sept. 11, 1962 |

FOREIGN PATENTS

| | | |
|---|---|---|
| 606,001 | Great Britain | Aug. 4, 1948 |